United States Patent
Peng et al.

(10) Patent No.: US 9,392,654 B2
(45) Date of Patent: Jul. 12, 2016

(54) METHOD AND APPARATUS FOR CONTROLLING A POWER ADJUSTMENT TO A LIGHTING DEVICE

(71) Applicant: Marvell World Trade Ltd., St. Michael (BB)

(72) Inventors: Hao Peng, Sunnyvale, CA (US); Wanfeng Zhang, Palo Alto, CA (US); Jinho Choi, Saratoga, CA (US); Tuyen Doan, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 180 days.

(21) Appl. No.: 13/974,890

(22) Filed: Aug. 23, 2013

(65) Prior Publication Data

US 2014/0063857 A1 Mar. 6, 2014

Related U.S. Application Data

(60) Provisional application No. 61/695,542, filed on Aug. 31, 2012.

(51) Int. Cl.
*H02M 3/335* (2006.01)
*H05B 33/08* (2006.01)

(52) U.S. Cl.
CPC ....... *H05B 33/0815* (2013.01); *H02M 3/33507* (2013.01); *Y02B 20/346* (2013.01)

(58) Field of Classification Search
CPC .............................. H03K 5/00006; H03K 7/00
USPC .............. 363/15–17, 19, 21.02, 21.07, 21.08, 363/21.09, 21.12, 21.1; 315/307–308, 312, 315/85, 186, 200 R, 246, 247, 291, 294, 315/297, 274, 224
See application file for complete search history.

(56) References Cited

U.S. PATENT DOCUMENTS

| | | | |
|---|---|---|---|
| 8,698,423 B2* | 4/2014 | Zhang et al. ................. | 315/307 |
| 8,766,554 B1* | 7/2014 | Zhang et al. ................. | 315/291 |
| 8,847,517 B2* | 9/2014 | Sutardja et al. .............. | 315/307 |
| 8,937,435 B1* | 1/2015 | Sutardja et al. .............. | 315/219 |
| 2008/0116818 A1* | 5/2008 | Shteynberg et al. ......... | 315/192 |
| 2008/0192515 A1* | 8/2008 | Huynh et al. ............... | 363/21.12 |
| 2008/0259654 A1* | 10/2008 | Huynh et al. ............... | 363/21.16 |
| 2010/0090618 A1* | 4/2010 | Veltman ....................... | 315/307 |
| 2010/0134038 A1* | 6/2010 | Shackle et al. .............. | 315/291 |
| 2011/0109230 A1* | 5/2011 | Simi ............................ | 315/119 |
| 2011/0193494 A1* | 8/2011 | Gaknoki et al. ............. | 315/297 |
| 2012/0153858 A1* | 6/2012 | Melanson et al. ........... | 315/279 |

(Continued)

FOREIGN PATENT DOCUMENTS

WO    WO 2011/045372 A1    4/2011

OTHER PUBLICATIONS

International Search Report and Written Opinion issued Dec. 16, 2013 in Application No. PCT/US2013/056646.

*Primary Examiner* — Adolf Berhane
*Assistant Examiner* — Nusrat Quddus (57) ABSTRACT

Aspects of the disclosure provide a method. The method includes determining a power adjustment to a load, determining whether a switching frequency of a pulse width modulation (PWM) signal is within a specific range, and adjusting the switching frequency of the PWM signal based on the power adjustment to control power transfer to the load. The switching frequency is adjusted to remain in the specific range.

17 Claims, 6 Drawing Sheets

(56) References Cited

U.S. PATENT DOCUMENTS

| | | | |
|---|---|---|---|
| 2012/0280629 A1* | 11/2012 | Gaknoki et al. | 315/186 |
| 2012/0286663 A1* | 11/2012 | Puvanakijjakorn et al. | 315/85 |
| 2013/0049622 A1* | 2/2013 | Angeles | 315/224 |
| 2013/0057167 A1* | 3/2013 | Angeles | 315/200 R |
| 2013/0242622 A1* | 9/2013 | Peng et al. | 363/21.12 |
| 2013/0307434 A1* | 11/2013 | Zhang et al. | 315/219 |
| 2014/0265909 A1* | 9/2014 | Sadwick et al. | 315/224 |

\* cited by examiner

METHOD AND APPARATUS FOR CONTROLLING A POWER ADJUSTMENT TO A LIGHTING DEVICE

INCORPORATION BY REFERENCE

This present disclosure claims the benefit of U.S. Provisional Application No. 61/695,542, "Control Algorithms and Close Loop Regulation Methods for LED Drivers" filed on Aug. 31, 2012, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Light emitting diode (LED) lighting devices provide the advantages of low power consumption and long service life. Thus, LED lighting devices may be used as general lighting equipment to replace, for example, fluorescent lamps, bulbs, halogen lamps, and the like.

SUMMARY

Aspects of the disclosure provide a method. The method includes determining a power adjustment to a load, determining whether a switching frequency of a pulse width modulation (PWM) signal is within a specific range, and adjusting the switching frequency of the PWM signal based on the power adjustment to control power transfer to the load. The switching frequency is adjusted to remain in the specific range.

According to an aspect of the disclosure, to determine the power adjustment in the load, the method includes receiving a dimming characteristic of a power supply, determining a reference power corresponding to the dimming characteristic, estimating a transferred power that is controlled by the PWM signal, and determining the power adjustment based on the reference power and the transferred power.

Further, in an embodiment, the method includes estimating a bleeding power that is consumed by a bleeder circuit, and determining the power adjustment based on the reference power, the transferred power and the bleeding power.

In an example, the method includes generating the PWM signal with a pulse width being constant in each AC cycle, and adjusting the pulse width of the PWM signal when the switching frequency is at a bound of the specific range.

According to an aspect of the disclosure, the method includes generating the PWM signal with a pulse width being constant in each AC cycle, and adjusting the pulse width of the PWM signal to shape a current profile in the AC cycle.

In an embodiment, the method includes generating the PWM signal with a peak current being a first value in a primary winding of a magnetic component, and adjusting a time window in an AC cycle to allow the peak current being a second value in the primary winding of the magnetic component when the switching frequency is at a bound of the specific range.

Further, in an example, the method includes adjusting a timing window in an AC cycle to turn on a bleeder circuit that consumes power to bleed a portion of the transferred energy when the switching frequency is at a bound of the specific range.

Aspects of the disclosure provide a circuit including a controller. The controller is configured to determine a power adjustment to a load, determine whether a switching frequency of a pulse width modulation (PWM) signal is in a specific range and adjust the switching frequency of the PWM signal based on the power adjustment to control power transfer to the load. The switching frequency is adjusted to remain in the specific range.

Aspects of the disclosure provide an apparatus that includes a magnetic component, a switch and a controller. The magnetic component is configured to transfer power from a power supply source to a load. The switch is in connection with the magnetic component to control the power transfer. The controller is configured to determine a power adjustment in the load, determine whether a switching frequency of a pulse width modulation (PWM) signal is in a specific range, and adjust the switching frequency of the PWM signal based on the power adjustment. The switching frequency is adjusted to remain in the specific range.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
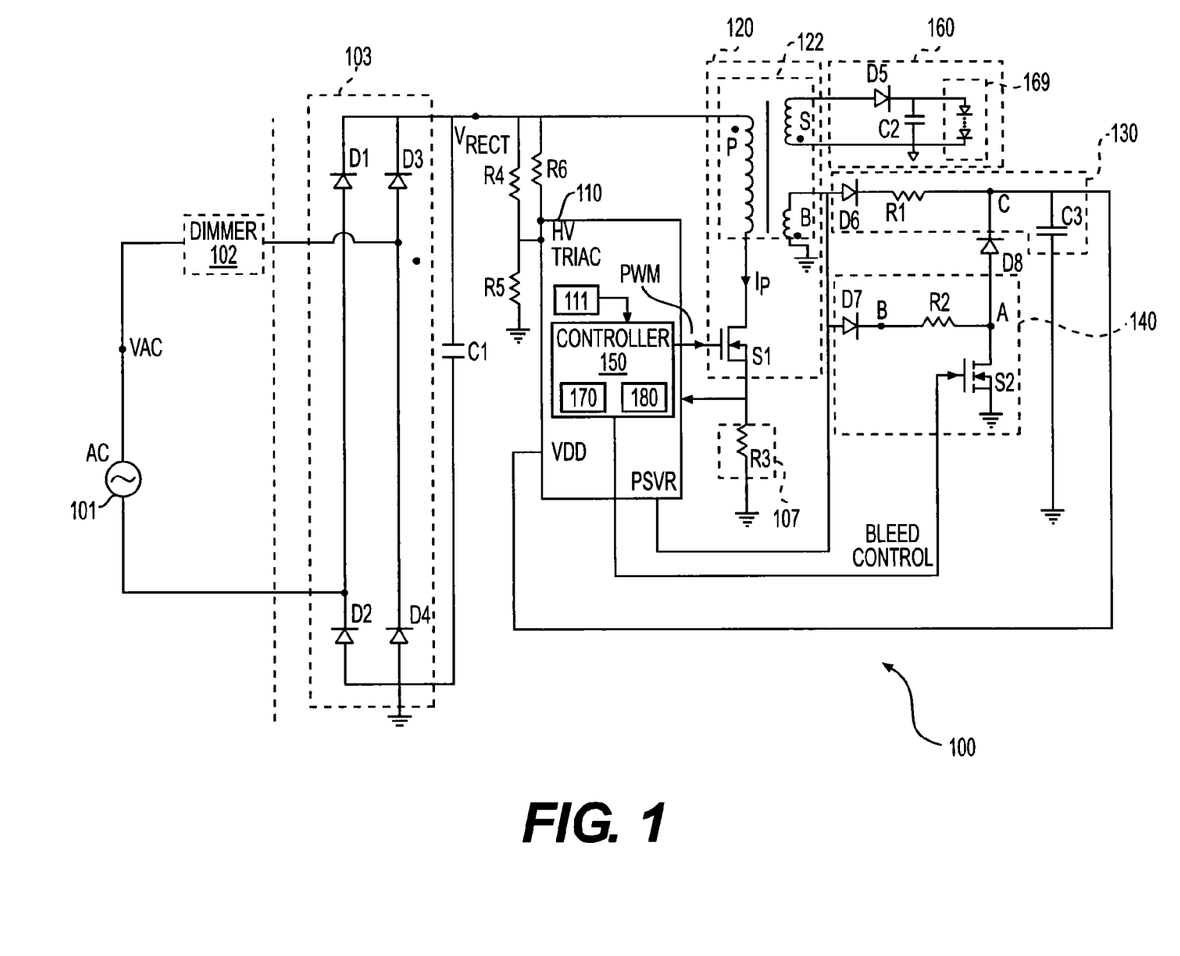
FIG. 1 shows a circuit diagram of an electronic system 100 according to an embodiment of the disclosure.

FIG. 1 shows a circuit diagram of an electronic system 100 according to an embodiment of the disclosure. The electronic system 100 operates based on an alternating current (AC) voltage $V_{AC}$ provided by an AC power supply 101 with or without a dimmer 102. The AC power supply 101 can be any suitable AC power supply, such as 60 Hz 110V AC power supply, 50 Hz 220V AC power supply, and the like.

The electronic system 100 is configured with tolerance to variations, such as power supply variations, components variations, environment variations, and the like. In an embodiment, the electronic system 100 is a lighting system, such as a light emitting diode (LED) lighting device, which is operable with or without the dimmer 102. When the dimmer 102 does not exist, the electronic system 100 is configured to meet LED current requirements, power factor correction (PFC) requirement and total harmonic distortion (THD) reduction requirement with tolerance to, for example, voltage variation of the power supply, inductance variation of magnetic components, clock frequency variation of a clock generation circuit, and the like. When the dimmer 102 exists, the electronic system 100 is configured to meet a dimming requirement, user experience requirement (e.g., no flicker and no shimmering) with tolerance to, for example, voltage variation of the power supply, inductance variation of magnetic components, clock frequency variation of a clock generation circuit, and the like.

According to an aspect of the disclosure, the electronic system 100 is operable under various dimming characteristic of the power supply. In an example, a power supply may have a pre-installed phase-cut dimmer 102, such as a triode for alternating current (TRIAC) type dimmer having an adjustable dimming angle α. The dimming angle α defines a size of a phase-cut range during which a TRIAC in the dimmer 102 is turned off. A phase range that is out of the phase-cut range is referred to as a conduction angle, and the TRIAC is turned on during the conduction angle.

During an AC cycle, when the phase of the AC voltage $V_{AC}$ is in the phase-cut range, the TRIAC is turned off. Thus, an output voltage of the dimmer 102 is about zero. When the phase of the AC voltage $V_{AC}$ is out of the phase-cut range (e.g., in the conduction angle), the TRIAC is turned on. Thus, the output voltage of the dimmer 102 is about the same as the AC voltage $V_{AC}$. The phase-cut dimmer 102 can be a leading edge TRIAC, a trailing edge TRIAC, or other types of dimmer.

Generally, the TRIAC type dimmer 102 requires a holding current, such as in a range of 8 to 40 mA, and the like, to remain the current conduction during the conduction angle. In an example, when a current draw from the TRIAC type dimmer 102 during the conduction angle is lower than the holding current, such as in a deep dimming situation, the TRIAC within the dimmer 102 may be prematurely turned off, which may cause flicking or shimmering in a light device that is controlled by the dimmer 102 and cause unpleasant user experience. According to an embodiment of the disclosure, when the TRIAC type dimmer 102 exists, the electronic system 100 is configured to maintain the current draw from the TRIAC type dimmer 102 to be above the holding current to avoid the premature turn-off, such that the user experience can be improved.

Further, according to an aspect of the disclosure, when the power supply and the electronic system 100 do not have any dimmer, the electronic system 100 is configured to improve energy efficiency. In an example, the electronic system 100 is configured to perform power factor correction (PFC) and total harmonic distortion (THD) reduction to improve energy efficiency.

Specifically, in the FIG. 1 example, the electronic system 100 includes a rectifier 103, a control circuit 110, an energy transfer module 120, a current sensor 107, a charging circuit 130, a bleeder circuit 140, a diode D8, and an output circuit 160. These elements are coupled together as shown in FIG. 1.

The rectifier 103 rectifies an AC voltage to a fixed polarity, such as to be positive. In the FIG. 1 example, the rectifier 103 is a bridge rectifier. The bridge rectifier 103 receives the AC voltage, or the output voltage of the dimmer 102, and rectifies the received voltage to a fixed polarity, such as to be positive. In the FIG. 1 example, the electronic system 100 includes a capacitor C1 to remove high frequency noise in the rectified voltage $V_{RECT}$. The rectified voltage $V_{RECT}$ is provided to the following circuits, such as the control circuit 110, the energy transfer module 120, and the like, in the electronic system 100.

The energy transfer module 120 transfers electric energy provided by the rectified voltage $V_{RECT}$ to a plurality of circuits, such as the output circuit 160, the charging circuit 130, the bleeder circuit 140, and the like, under the control of the control circuit 110. In an embodiment, the energy transfer module 120 is configured to use a magnetic component, such as a transformer, inductors, and the like to transfer the electric energy. The energy transfer module 120 can have any suitable topology, such as a fly-back topology, a buck-boost topology, and the like. In the FIG. 1 example, the energy transfer module 120 includes a transformer 122 and a switch S1. The transformer 122 includes a primary winding (P) coupled with the switch S1 to receive the rectified voltage $V_{RECT}$, a first secondary winding (S) coupled to the output circuit 160 to drive the output circuit 160, and a second secondary winding (bias winding B) coupled with the charging circuit 130 and the bleeder circuit 140. It is noted that the energy transfer module 120 can be suitably modified to use one or more secondary windings to transfer the electric energy.

The current sensor 107 is configured to sense a current $I_P$ flowing through the primary winding, and provide the sensed current to the control circuit 110. In an example, the current sensor 107 includes a resistor R3 having a relatively small resistance such that a voltage drop on the resistor is small compared to the rectified voltage $V_{RECT}$. The voltage drop is indicative of the current $I_P$. In an example, the voltage drop is provided to the control circuit 110 as the sensed current.

The output circuit 160 includes a diode D5, a capacitor C2, and a load device 169. These elements are coupled together as shown in FIG. 1. The load device 169 can be any suitable device, such as a lighting device, a fan and the like. In an embodiment, the load device 169 includes a plurality of light emitting diodes (LEDs). The load device 169 and the other components of the electronic system 100 are assembled into a package to form an LED lighting device to replace, for example, a fluorescent lamp, a halogen lamp, and the like.

The charging circuit 130 includes a diode D6, a resistor R1 and a capacitor C3 coupled together as shown in FIG. 1. In an embodiment, the capacitor C3 is relatively large, such as in the order of 10 μF or above. The capacitor C3 is configured to store charge energy, and provides a supply voltage, such as VDD, for the control circuit 110.

The bleeder circuit 140 includes a diode D7, a resistor R2, and a switch S2 coupled together as shown in FIG. 1. The bleeder circuit 140 can be switched on and switched off. In the FIG. 1 example, the switch S2 is implemented using a transistor. When S2 is turned on to conduct current, the bleeder circuit 140 is switched on, and a current flows through the resistor R2 to deplete electrical energy, for example, convert electrical energy to thermal heat. When the transistor is turned off to stop conducting current, the bleeder circuit 140 is switched off.

In the FIG. 1 example, the diode D8 couples a node A in the bleeder circuit 130 with a node C in the charging circuit 140. In another embodiment, the diode D8 couples a node B in the bleeder circuit 130 with the node C in the charging circuit 140.

According to an embodiment of the disclosure, the control circuit 110 includes any suitable circuits, such as a detecting circuit 111, a controller 150, and the like. In an example, the detecting circuit 111 includes various signal processing circuits, such as analog signal processing circuit, digital signal processing circuit and the like to detect various parameters, such as a rectified voltage $V_{RECT}$, a dimming characteristic, a dimming angle, a current $I_P$ flowing through the switch S1, a voltage at the secondary winding, and the like.

In an example, the control circuit 110 includes an input pin HV configured to be able to receive a relatively high voltage, such as the rectified voltage $V_{RECT}$ via a resistor R6. In another example, the control circuit 110 includes an input pin TRIAC configured to receive the scaled rectified voltage via a voltage scaling circuit. The voltage scaling circuit can be formed as two serially connected resistors R4 and R5. The detecting circuit 111 monitors the input voltage, such as the rectified voltage $V_{RECT}$, the scaled rectified voltage, and the like, detects a time duration in a half AC cycle when the TRIAC in the dimmer 102 has been turned off, and calculates a percentage of the time duration to the half AC cycle. The percentage is referred to as a dim ratio and can be used to indicate the dimming characteristic of the power supply.

The controller 150 generates various control signals to control the operations in the electronic system 100. In an example, the controller 150 provides a pulse width modulation (PWM) signal with a relatively high switching frequency, such as in the order of 100 KHz, and the like, to control the switch S1 in order to transfer the electric energy from the primary winding to the secondary windings in the transformer 122.

Specifically, in an example, when the switch S1 is switched on, a current $I_P$ flows through the primary winding of the transformer 122, and the switch S1. The polarity of the transformer 122 and the direction of the diodes D5, D6 and D7 can be arranged such that there is no current in the secondary windings S and B when the switch S1 is switched on. Thus, the received electric energy is stored in the transformer 122.

When the switch S1 is switched off, the current $I_P$ becomes zero. The polarity of the transformer 122 and the direction of the diodes D5, D6 and D7 can enable the secondary windings S and B to deliver the stored electric energy to the output device 160, the charging circuit 130 and the bleeder circuit 140.

Further, in an embodiment, the controller 150 provides a bleed control signal to the switch S2 to control the operations of the switch S2 to turn on or turn off the bleeder circuit 140.

According to an aspect of the disclosure, the controller 150 generates the bleed control signal to switch on and off the bleeder circuit 140 based on the dimming characteristic of the power supply. In an example, when the power supply has the zero-dimming characteristic or the low-dimming characteristic, the controller 150 generates the bleed control signal to switch off the bleeder circuit 140. When the dimming angle of the power supply increases, the energy transfer module 120 reduces power transferred from the power supply to the output circuit 160, and causes a current drawn from the power supply to decrease responsively for the dimming function. When the power supply is in the deep dimming characteristic, the power reduction in the load device can cause the current drawn from the power supply to be lower than the holding current for the dimmer 102. Then, the controller 150 generates the bleed control signal to suitably switch on the bleeder circuit 140, such as during a time window, to deplete power and thus draw additional current from the power supply, and then the total current drawn from the power supply can satisfy the holding current requirement for the dimmer 102 during the conduction angle to avoid the premature TRIAC turn-off.

According to an aspect of the disclosure, the controller 150 is configured to use close loop regulation techniques to regulate the control signal generation in order to satisfy various requirements with tolerance to various variations. In an embodiment, the requirements for the electronic system 100 are different with or without a dimmer 102, thus the controller 150 is configured to use different close loop regulation techniques with or without the dimmer 102.

Specifically, in the FIG. 1 example, the controller 150 includes a first control module 170 configured to perform a first close loop regulation when the dimmer 102 exists; and a second control module 180 configured to perform a second close loop regulation when the dimmer 102 does not exist. It is noted that the first control module 170 and the second control module 180 can be respectively implemented by various techniques. In an embodiment, the first control module 170 and the second control module 180 are implemented using integrated circuits; and in another embodiment, the first control module 170 and the second control module 180 are implemented as software instructions that can cause a processor to perform the close loop regulations.

Specifically, the first control module 170 is configured to perform the first close loop regulation based on a first algorithm that maintains a relatively constant peak current in the primary winding when the TRIAC in the dimmer 102 is turned on. In an example, when the TRIAC in the dimmer 102 is turned on, the first algorithm causes the control circuit 110 to provide the PWM signal to the switch S1 to repetitively turn on and off the switch S1 to maintain the relatively constant peak current. For example, at a time, the control circuit 110 changes the PWM signal from "0" to "1" to turn on the switch S1. When the switch S1 is turned on, the current $I_P$ starts to increase. The current sensor 107 senses the current $I_P$, for example, in a form of a voltage drop on a resistor, and provides sensed voltage drop to the control circuit 110. Based on the sensed voltage drop, the control circuit 110 changes the PWM signal from "1" to "0" to turn off the switch S1 when the sensed voltage drop is substantially equal to a threshold, such as 0.4V, and the like.

Further, the first control module 170 regulates parameters of the first algorithm to satisfy requirements, such as dimming requirement, user experience requirement, and the like with tolerance to various variations. In an embodiment, the first control module 170 determines a power regulation to the output circuit 160, such as in the form of a current regulation to the output circuit 160, based on monitored parameters, such as turn-on time, and the like. Generally, the power regulation can be achieved by various parameter adjustments in the first algorithm. In an embodiment, frequency adjustment (or period adjustment) of the PWM signal to achieve the power regulation has various advantages, such as a better control, easy implementation, and the like, over other parameter adjustments. Then, in the embodiment, as long as the frequency adjustment maintains the switching frequency in a specific range, such as between 70 KHz and 200 KHz, the first control module 170 performs the frequency adjustment for the power regulation. When the frequency adjustment cannot maintain the switching frequency in the specific range, the first control module 170 adjusts other parameters. In an example, when the frequency adjustment will cause the switching frequency to above the maximum frequency, the first control module 170 adjusts a peak current profile to increase transferred power to the output device 160; and when the frequency adjustment will cause the switching frequency to below the minimum frequency, the first control module 170 controls the bleeder circuit 140 to deplete power in order to reduce transferred power to the output device 160.

The second control module 180 is configured to perform the second close loop regulation based on a second algorithm that controls a relatively constant turn-on time of the switch S1. In an example, according to the second algorithm, the control circuit 110 maintains pulses in the PWM signal to have the same pulse width during an AC cycle, such that the turn-on time of the switch S1 over the switching cycles in the AC cycle is about the same. It is noted that, according to an aspect of the disclosure, the turn-on time in different AC cycles can be different. In an example, the turn-on time and switching frequency are fixed during an AC cycle, but are adaptively changed over time.

Further, in an embodiment, the second control module 180 uses a quasi-resonant control method. According to the quasi-resonant control method, the switching frequency of the PWM signal is not fixed, and is synchronized with a resonance frequency governed by inductance and capacitance in the electronic system 100. In this example, a voltage across the secondary winding B of the transformer 122 is sensed and provided to the control circuit 110 via a pin PSVR. When the switch S1 is turned off, the voltage across the secondary winding resonates. The second control module 180 changes the PWM signal from "0" to "1" when the voltage across the secondary winding is at a valley.

Further, the second control module 180 regulates parameters of the second algorithm to satisfy requirements, such as a PFC requirement, a THD requirement, and the like, with tolerance to various variations. In an embodiment, the second control module 170 determines a power regulation to the output circuit 160, such as a current regulation to the output circuit 160, based on monitored parameters, such as a profile of the peak current in the primary winding, and the like. Generally, the power regulation can be achieved by various parameter adjustments, such as a frequency adjustment, a turn-on time adjustment, in the second algorithm. Then, in the embodiment, the second control module 170 determines suitable parameter adjustments to achieve the power regulation and satisfy the PFC requirement, the THD requirement.

It is noted that the electronic system 100 can be implemented using one or more integrated circuit (IC) chips. In an example, the control circuit 110 is implemented as a single IC chip, the switch S1 and switch S2 can be implemented on another IC chip, or can be implemented as discrete components. In another example, the switches S1 and S2 can be integrated with the control circuit 110 on the same IC chip.

Figure 2:
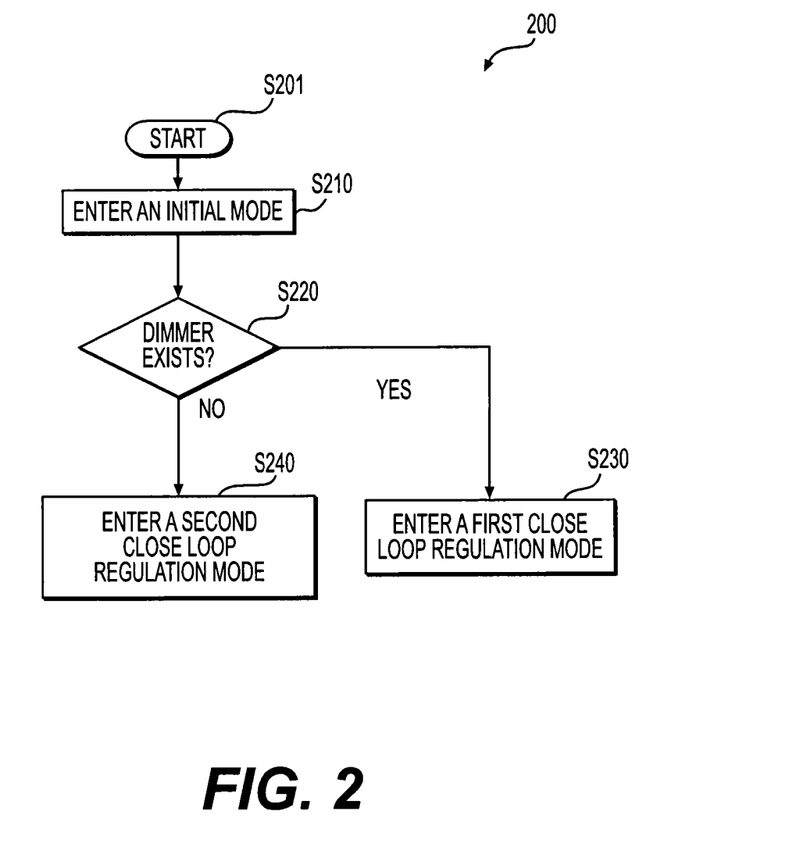
FIG. 2 shows a flow chart outlining a process example 200 according to an embodiment of the disclosure.

FIG. 2 shows a flow chart outlining a process example 200 according to an embodiment of the disclosure. In an example, the process 200 is executed by a controller, such as the controller 150, at the time when the electronic system 100 is powered up. The process starts at S201 and proceeds to S210.

At S210, the controller enters an initial mode at the time of power up. In an example, in the initial mode, the controller 150 is configured to generate control signals to enable the electronic system 100 to operate in any situation, even a worst case. For example, in the initial mode, the control signals enable the electronic system 100 to be operable (e.g., without negatively affecting user experience) even if the power supply has the deep dimming characteristic, and the components of the electronic system 100 have corner values that most negatively affect the operation of the electronic system 100. In an embodiment, in the initial mode, the PWM signal is generated to maintain a relatively constant peak current of $I_P$ in the primary winding, and the bleed control signal is generated to maintain a relatively large bleed window. Then, parameters of the electronic system 100 are monitored to determine suitable control algorithm and suitable power regulation.

At S220, the controller determines whether a dimmer exists. In an example, the detecting circuit 111 detects a dimming characteristic, such as a dimming angle, a dim ratio, and the like. Then, the dimming characteristic is used to determine the existence of a dimmer. For example, when the dim ratio is about zero, the controller 150 determines that the dimmer 102 does not exist; and when the dim ratio is larger than a threshold, such as 5% and the like, the controller 150 determines that the dimmer 102 exists. When the dimmer 102 exists, the process proceeds to S230; otherwise, the process proceeds to S240.

At S230, the controller enters a first close loop regulation mode when the dimmer 102 exists. In the FIG. 1 example, when the dimmer 102 exists, the first control module 170 is activated to generate the control signals based on the first algorithm that maintains a relative constant peak current. Then, the first control module 170 receives information from the detecting circuit 111, determines power regulation, and regulates parameters of the first algorithm according to the first close loop regulation. The first close loop regulation enables the electronic system 100 to satisfy dimming requirements, such as a dimming curve requirement, user experience requirement, with tolerance to various variations, such as inductance variation, clock frequency variation, and the like. The first close loop regulation will be described in detail with regard to FIGS. 3 to 5.

At S240, the controller enters a second close loop regulation mode when the dimmer 102 does not exist. In the FIG. 1 example, when the dimmer 102 does not exist, the second control module 180 is activated to generate the control signals based on the second algorithm that maintains a relatively constant pulse width (turn-on time) in each half AC cycle. Then, the second control module 180 receives information from the detecting circuit 111, determines power regulation, and regulates parameters of the second algorithm according to the second close loop regulation. The second close loop regulation enables the electronic system 100 to satisfy LED current rating, THD and PFC requirement with tolerance to various variations, such as inductance variation, clock frequency variation, and the like. The second close loop regulation will be described in detail with regard to FIG. 6.

Figure 3:
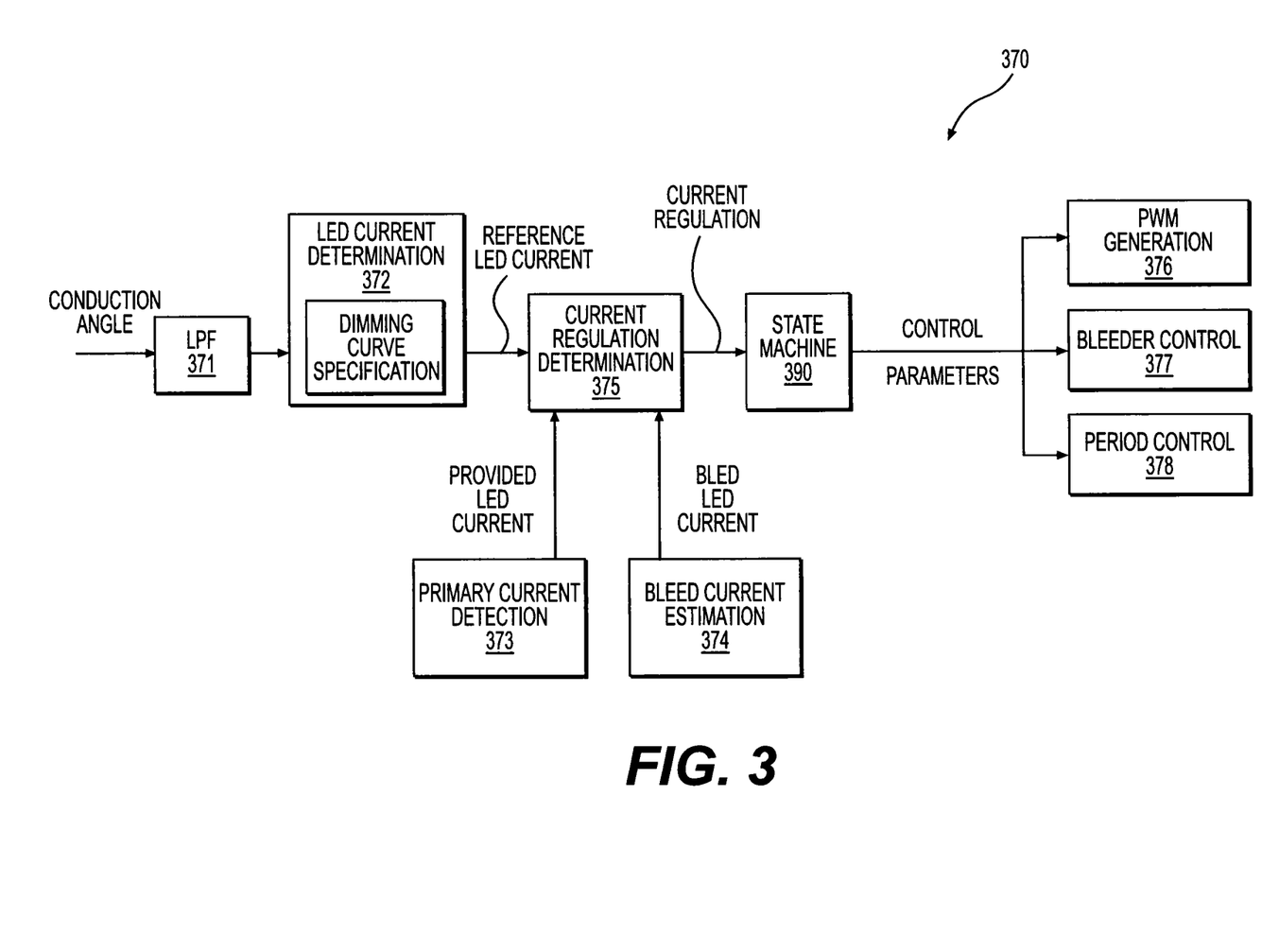
FIG. 3 shows a block diagram of a control module 370 according to an embodiment of the disclosure.

FIG. 3 shows a block diagram of a control module 370 according to an embodiment of the disclosure. In an example, the control module 370 can be used in the electronic system 100 as the first control module 170. The control module 370 is configured to generate the control signals, such as the PWM signal, the bleed control signal, and the like, based on the first algorithm that maintains a relative constant peak current.

The control module 370 includes a low pass filter (LPF) 371, an LED current determination module 372, a current regulation determination module 375, a state machine 390, a PWM generation module 376, a bleeder control module 377, a period control module 378, a primary current detection module 373, a bleed current estimation module 374. These elements are coupled together as shown in FIG. 3.

The low pass filter 371 receives a detected conduction angle, removes noise to smooth the conduction angle, and provides the filtered conduction angle to the LED current determination module 372. The LED current determination module 372 determines a reference power corresponding to the conduction angle. In an example, the reference power is represented in the form of a reference LED current. According to an embodiment of the disclosure, the LED current determination module 372 determines the reference LED current according to a dimming curve specification. In an example, a dimming curve specification is pre-determined, for example, based on a standard from National Electrical Manufactures Association (NEMA). The dimming curve specification specifies a relationship of conduction angle with relative LED current. The relative LED current is a percentage of an LED current with dimming to a full LED current without dimming. Thus, given a conduction angle, the LED current corresponding to the conduction angle can be determined based on the dimming curve specification and the full LED current. The determined LED current corresponding to the conduction angle is then provided to the current regulation determination module 375 as the reference LED current.

The primary current detection module 373 and the bleed current estimation module 374 respectively determine the provided power from the primary winding and the bled power by a bleeder circuit, such as the bleeder circuit 140. In an example, the primary current detection module 373 determines the provided power in the term of a provided LED current for the output device 169 corresponding to the provided power from the primary winding. For example, the provided power can be determined as a function of the monitored current $I_P$ in the primary winding and the time that the switch S1 has been turned on during an AC cycle. The bleed current estimation module 374 determines the bled power in the term of a bled LED current in the output device 169 corresponding to the bled power by the bleeder circuit 140. For example, the bled LED current can be determined as a function of a voltage of the output device 169, a voltage on the resistor R2, the resistance of the resistor R2, and a bleed window size.

The current regulation determination module 375 receives the reference LED current, the provided LED current and the bled LED current, and determines a power regulation, such as a current regulation. In an example, the current regulation determination module 375 substrates the bled LED current from the provided LED current to estimate an actual LED current in the output device 169. When the actual LED current is larger than the reference LED current, the current regulation determination module 375 determines to decrease the LED current; and when the actual LED current is smaller than the reference LED current, the current regulation determination module 375 determines to increase the LED current. The determined current regulation is provided to the state machine 390.

Figure 4:
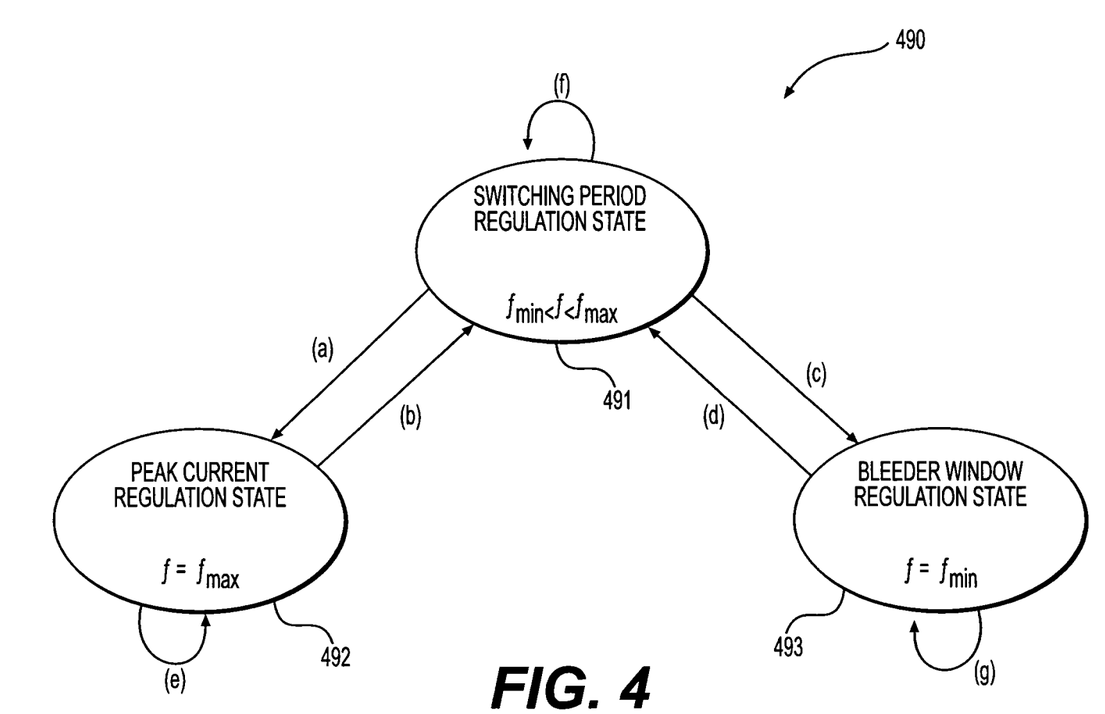
FIG. 4 shows a diagram of a state machine example 490 according to an embodiment of the disclosure.

The state machine 390 is configured to determine control parameters based on the power regulation (e.g., the current regulation). An example of the state machine 390 is shown in FIG. 4, and will be described in detail. The state machine 390 includes multiple states and adjusts different parameters in the different states.

The PWM generation module 376 is configured to generate pulses based on the control parameters from the state machine 390. For example, one of the control parameters is peak current. In an example, after the PWM generation module 376 generates a leading edge of a pulse, the voltage drop on the resistor R3 is tracked. When the voltage drop reaches a limit, such as 0.4V, the PWM generation module 376 generates the trailing edge of the pulse.

The period control module 378 is configured to control the switching period based on the control parameters from the state machine 390. For example, one of the control parameters is switching frequency that corresponds to the switching period. In an example, the period control module 378 controls an off time between pulses. In another example, the switching frequency of the PWM signal is controlled based on a clock generation circuit that includes a ring oscillator. The period control module 378 controls a voltage provided to the ring oscillator to adjust an oscillation frequency of the ring oscillator in order to control the switching frequency of the PWM signal.

The bleeder control module 377 is configured to generate the bleeder control signal to define a bleeder window. For example, one of the control parameters is bleeder window size. In an example, the bleeder control module 377 controls the bleed control signal such that the switch S2 has been switched on for a time duration equivalent to the bleeder window size when the TRIAC in the dimmer 102 is turned on.

FIG. 4 shows a diagram of a state machine example 490 according to an embodiment of the disclosure. In an example, the state machine 490 is used in the control module 370 as the state machine 390. The state machine 490 includes a first state 491, a second state 492 and a third state 493.

In the FIG. 4 example, the state machine 490 has the first state 491 when the switching frequency (f) is smaller than the maximum switching frequency ($f_{max}$) and is larger than the minimum switching frequency ($f_{min}$). The state machine 490 has the second state 492 when the switching frequency is at the maximum switching frequency. The state machine 490 has the third state 493 when the switching frequency is at the minimum switching frequency.

In the first state 491, the current regulation is conducted by adjusting the switching frequency (or switching period) and the state machine remains in the first state 491 as long as the switching frequency f is maintained in a specific range, such as smaller than the maximum switching frequency, and larger than the minimum switching frequency, as shown by an arrow (f). For example, in the first state 491, when the current regulation is to increase current, the switching frequency is increased as long as the increased switching frequency is lower than the maximum switching frequency; and when the current regulation is to decrease current, the switching frequency is decreased as long as the decreased switching frequency is higher than the minimum switching frequency.

In the first state 491, when the switching frequency overflows, the state machine 490 enters the second state 492 as shown by an arrow (a); and when the switch frequency underflows, the state machine 490 enters the third state 493 as shown by an arrow (c).

In the second state 492, the switching frequency is at the maximum switching frequency, and the peak current profile is adjusted for current regulation. In an example, the peak current profile specifies a window (referred to as second OCP window) within the time duration when the TRIAC is turned on. In the second OCP window, the peak current is allowed to be larger than the constant peak current. In the FIG. 1 example, according to the first algorithm, generally, when the primary current $I_P$ increases to the constant peak current (e.g., the voltage drop on the resistor R3 reaches a limit, such as 0.4V), the switch S1 is switched off. During the second OCP window, the voltage drop on the resistor R3 is allowed to be higher than the limit in order to transfer more energy from the primary winding to the secondary windings in each switching cycle of the switch S1. In an example, during the second OCP window, the voltage drop limit is allowed to increase gradually from 0.4V to 0.6V, stays at 0.6V for a time, and then drops gradually from 0.6V to 0.4V.

In an embodiment, in the second state 492, the current regulation is conducted by adjusting a second OCP window size ($W_C$) as long as the second OCP window size is not zero, as shown by an arrow (e). For example, in the second state 492, when the current regulation is to increase current, the second OCP window size is increased; and when the current regulation is to decrease current, the second OCP window size is decreased as long as the decreased second OCP window size is larger than zero.

In the second state 492, when the current regulation is to decrease the current and the second OCP window size is zero, the state machine 490 enters the first state 490 as shown by an arrow (b).

In the third state 493, the current regulation is conducted by controlling a bleeder window size for a bleeder circuit, such as the bleeder circuit 140. In an example, the bleeder window size specifies a time duration during which the bleeder circuit 140 is turned on to deplete a portion of the transferred power from the primary winding to the secondary windings. The bleeder window size can be adjusted for LED current regulation.

In an example, in the third state 493, the current regulation is conducted by adjusting the bleeder window size ($W_B$) as long as the bleeder window size is not zero, as shown by an arrow (g). For example, in the third state 493, when the current regulation is to increase current, the bleeder window size is decreased as long as the decreased bleeder window size is larger than zero; and when the current regulation is to decrease current, the bleeder window size is increased.

In the third state 493, when the current regulation is to increase the current and the bleeder window size is zero the state machine 490 enters the first state 490, as shown by an arrow (d).

Figure 5A:
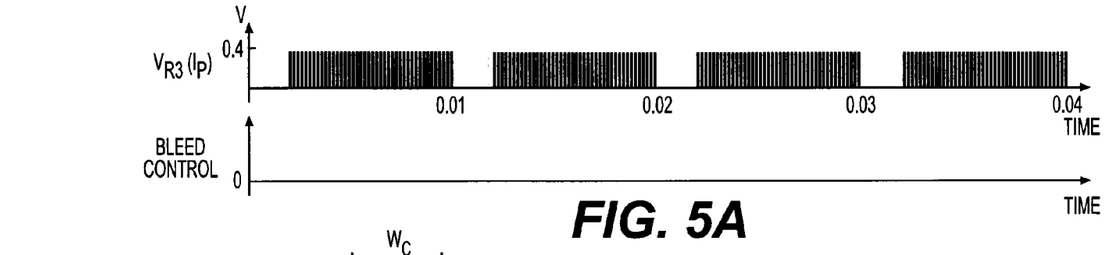
FIGS. 5A-5C show waveforms according to an embodiment of the disclosure.

FIG. 5A shows waveforms for the voltage drop on the resistor R3 ($V_{R3}$) and the bleed control signal when the state machine 490 is in the first state 491. The voltage drop is indicative of the current flowing through the primary winding P in the FIG. 1 example. In the first state 491, the pulse width of the PWM signal is modulated to maintain a relatively constant peak current. Further, in the first state 491, the second OCP window size and the bleeder window size are zero, and the LED current regulation is performed by regulating the switching frequency of the PWM signal.

Figure 5B:
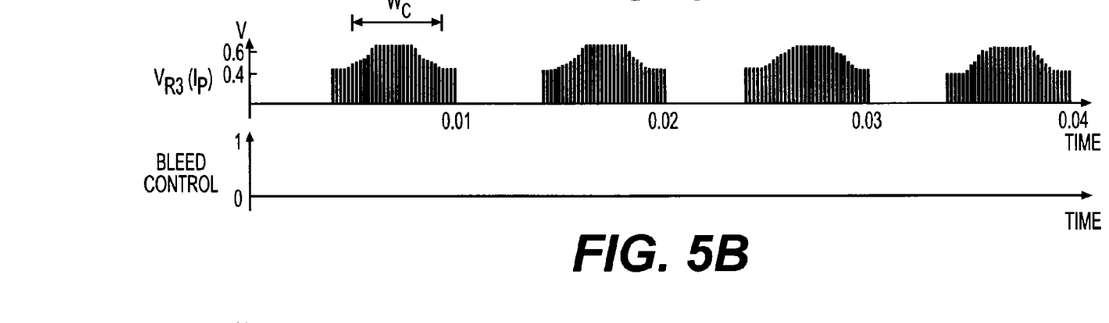

FIG. 5B shows waveforms for the voltage drop on the resistor R3 ($V_{R3}$) and the bleed control signal when the state machine 490 is in the second state 492. In the second state 492, the switching frequency is at the maximum switching frequency, the bleeder window size is zero, and the LED current regulation is performed by regulating the second OCP window size $W_C$. During the second OCP window, in the FIG. 5B example, the pulse width of the PWM signal is modulated to allow higher peak current flowing through the primary winding P.

Figure 5C:
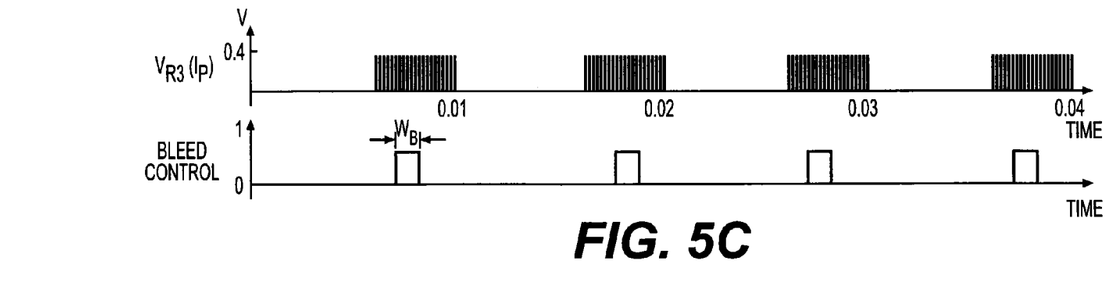

FIG. 5C shows waveforms for the voltage drop on the resistor R3 ($V_{R3}$) and the bleed control signal when the state machine 490 is in the third state 493. In the third state 493, the pulse width of the PWM signal is modulated to maintain the relatively constant peak current. Further, in the third state 493, the switching frequency is at the minimum switching frequency, the second OCP window size is zero, and the LED current regulation is performed by regulating the bleeder window size $W_B$.

Figure 6:
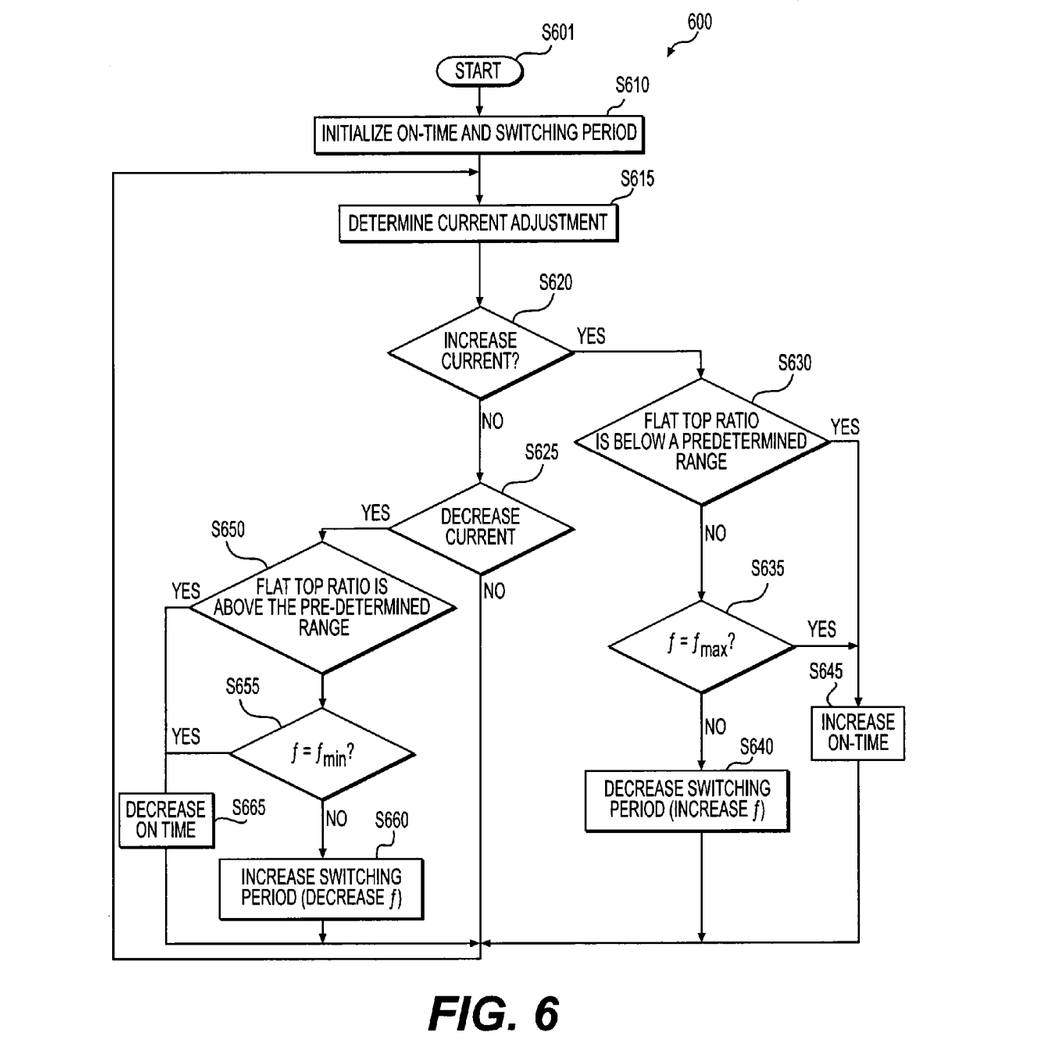
FIG. 6 shows a flow chart outlining a process example 600 according to an embodiment of the disclosure.

FIG. 6 shows a flow chart outlining a process example 600 according to an embodiment of the disclosure. In an example, the process 600 is executed by the second control module 180 to perform a close loop regulation. For example, the process 600 is executed at S240 when the dimmer 102 does not exist. Generally, the second control module 180 generates the PWM signal with a relatively constant pulse width to satisfy, for example, a PFC requirement, a THD requirement, and the like. The process starts at S601 and proceeds to S610.

At S610, the turn-on time and the switching period (or the switching frequency) are initialized. In an example, the second control module 180 initializes the turn-on time (pulse width) and the switching period, and provides the PWM signal based on the turn-on time and the switching period. According to an aspect of the disclosure, the second control module 180 uses a quasi-resonant control method. According to the quasi-resonant control method, a frequency of the PWM signal is not fixed, and is synchronized with a resonance frequency governed by inductance and capacitance in the electronic system 100. In this example, a voltage across the secondary winding B of the transformer 122 is sensed and provided to the control circuit 110 via a pin PSVR. When the switch S1 is turned off, the voltage across the secondary winding resonates. The second control module 180 changes the PWM signal from "0" to "1" when the voltage across the secondary winding is at the valley.

At S615, a current regulation is determined. In an example, the second control module 180 determines the current regulation based on various monitored parameters. For example, the second control module 180 receives monitored peak current in the primary winding (e.g., the voltage drop on the resistor R3), measures a time duration that the peak current reaches a limit (e. the voltage drop reaches 0.6V), and calculates a ratio of the time duration to a half AC cycle. The ratio is referred to as a flat top ratio. In an embodiment, the flat top ratio is preferred to stay within a pre-determined range, such as from 1/8 to 1/4. When the flat top is out of the range, the second control module 180 determines the current regulation to change the flat top ratio. For example, when the flat top ratio is larger than 1/4, the second control module 180 determines to decrease current. When the flat top ratio is smaller than 1/8, the second control module 180 determines to increase current.

At S620, the second control module 180 determines whether the current regulation is to increase current. When the current regulation is to increase current, the process proceeds to S630; otherwise, the process proceeds to S625.

At S625, the second control module 180 determines whether the current regulation is to decrease current. When the current regulation is to decrease current, the process proceeds to S650; otherwise, the process returns to S615.

At S630, the second controller 180 determines whether the flat top ratio is below the predetermined range, such as below the lower bound 1/8 of the range. When the flat top ratio is below the lower bound, the process proceeds to S645; otherwise, the process proceeds to S635.

At S635, the second control module 180 determines whether the switching frequency is at the maximum switching frequency. When the switching frequency is at the maximum switching frequency, the process proceeds to S645; otherwise, the process proceeds to S640.

At S640, the second control module 180 decreases the switching period (increase the switching frequency). Then, the process returns to S615.

At S645, the second control module 180 increases the turn-on time (pulse width). Then the process returns to S615.

At S650, the second control module 180 determines whether the flat top ratio is above the predetermined range, such as above the upper bound 1/4 of the range. When the flat top ratio is above the upper bound, the process proceeds to S665; otherwise, the process proceeds to S655.

At S655, the second control module 180 determines whether the switching frequency is at the minimum switching frequency. When the switching frequency is at the minimum switching frequency, the process proceeds to S665; otherwise, the process proceeds to S660.

At S660, the second control module 180 increases the switching period (decrease the switching frequency). Then, the process returns to S615.

At S665, the second control module 180 decreases the turn-on time (pulse width) and the process returns to S615.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   determining a power adjustment to a load;
   determining whether a switching frequency of a pulse width modulation (PWM) signal is within specific range;
   adjusting the switching frequency of the PWM signal based on the power adjustment to control power transfer to the load, the switching frequency being adjusted to remain in the specific range; and adjusting a pulse width of the PWM signal to maintain a constant peak current,
wherein determining the power adjustment in the load further includes receiving a dimming characteristic of a power supply, determining a reference power corresponding to the dimming characteristic, estimating a transferred power that is controlled by the PWM signal, and determining the power adjustment based on the reference power and the transferred power.

2. The method of claim 1, further comprising:
estimating a bleeding power that is consumed by a bleeder circuit; and
determining the power adjustment based on the reference power, the transferred power and the bleeding power.

3. The method of claim 1, further comprising:
generating the PWM signal with the pulse width being constant in each AC cycle; and
adjusting the pulse width of the PWM signal when the switching frequency is at a bound of the specific range.

4. The method of claim 1, further comprising:
generating the PWM signal with the pulse width being constant in each AC cycle; and
adjusting the pulse width of the PWM signal shape a current profile in the AC cycle.

5. The method of claim 1, further comprising:
generating the PWM signal with a peak current being a first value in a primary winding of a magnetic component; and
adjusting a time window in an AC cycle to allow the peak current being a second value in the primary winding of the magnetic component when the switching frequency is at a bound of the specific range.

6. The method of claim 1, further comprising:
adjusting a timing window in an AC cycle to turn on a bleeder circuit that consumes power to bleed a portion of the transferred power when the switching frequency is at a bound of the specific range.

7. A circuit including a controller configured to:
determine a power adjustment to a load;
determine whether a switching frequency of a pulse width modulation (PWM) signal is in a specific range;
adjust the switching frequency of the PWM signal based on the power adjustment to control power transfer to the load, the switching frequency being adjusted to remain in the specific range; and
adjust a pulse width of the PWM signal to maintain a constant peak current,
wherein the controller is configured to receive a dimming characteristic of a power supply, determine a reference power corresponding to the dimming characteristic, estimate a transferred power that is controlled by the PWM signal, and determine the power adjustment based on the reference power and the transferred power.

8. The circuit of claim 7, wherein the controller is configured to
estimate a bleeding power that is consumed by a bleeder circuit; and
determine the power adjustment based on the reference power, the transferred power and the bleeding power.

9. The circuit of claim 7, wherein controller is configured to:
generate the PWM signal with the pulse width being constant in each AC cycle; and
adjust the pulse width the PWM signal when the switching frequency is at a bound of the specific range.

10. The circuit of claim 7, wherein the controller is configured to:
generate the PWM signal with the pulse width being constant in each AC cycle; and
adjust the pulse width of the PWM signal to shape a peak current profile in the AC cycle.

11. The circuit of claim 7, wherein the controller is configured to:
generate the PWM signal with a peak current being a first value in a primary winding of a magnetic component; and
adjust a time window in an AC cycle to allow the peak current being a second value in the primary winding of the magnetic component when the switching frequency is at a bound of the specific range.

12. The circuit of claim 7, wherein the controller is configured to:
adjust a timing window in an AC cycle to turn on a bleeder circuit that consumes power to bleed a portion of the transferred power when the switching frequency is at a bound of the specific range.

13. An apparatus, comprising:
a magnetic component configured to transfer power from a power supply source to a load;
a switch in connection with the magnetic component to control the power transfer;
a controller configured to determine a power adjustment in the load, determine whether a switching frequency of a pulse width modulation (PWM) signal is in a specific range, adjust the switching frequency of the PWM signal based on the power adjustment, the switching frequency being adjusted to remain in the specific range, and adjust a pulse width of the PWM signal to maintain a constant current peak; and
a detecting circuit configured to detect a dimming characteristic of the power supply, wherein the controller is configured to determine a reference power corresponding to the dimming characteristic, estimate a transferred power that is controlled by the PWM signal, and determine the power adjustment based on the reference power and the transferred power.

14. The apparatus of claim 13, wherein the controller is configured to
estimate a bleeding power that is consumed by a bleeder circuit; and
determine the power adjustment based on the reference power, the transferred power and the bleeding power.

15. The apparatus of claim 13, wherein the controller is configured to:
generate the PWM signal with the pulse width being constant in each AC cycle; and
adjust the pulse width of the PWM signal when the switching frequency is at a bound of the specific range.

16. The apparatus of claim 13, wherein the controller is configured to:
generate the PWM signal with the peak current being a first value in a primary winding of the magnetic component; and
adjust a time window in an AC cycle to allow the peak current being a second value in the primary winding of the magnetic component when the switching frequency is at a bound of the specific range.

17. The apparatus of claim 13, wherein the controller is configured to:
adjust a timing window in an AC cycle to turn on a bleeder circuit that consumes power to bleed a portion of the transferred power when the switching frequency is at a bound of the specific range.

* * * * *